April 24, 1956
M. ROTH
2,743,086
PELLET IMPACT REAMING APPARATUS
Filed Jan. 29, 1952
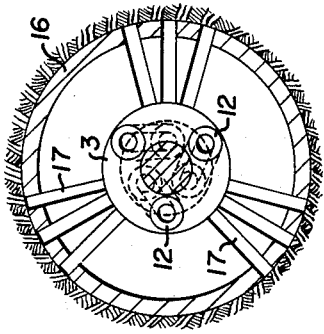
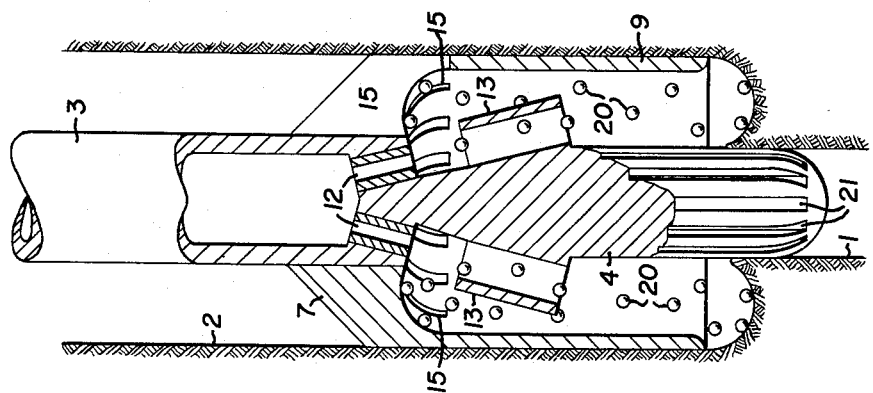
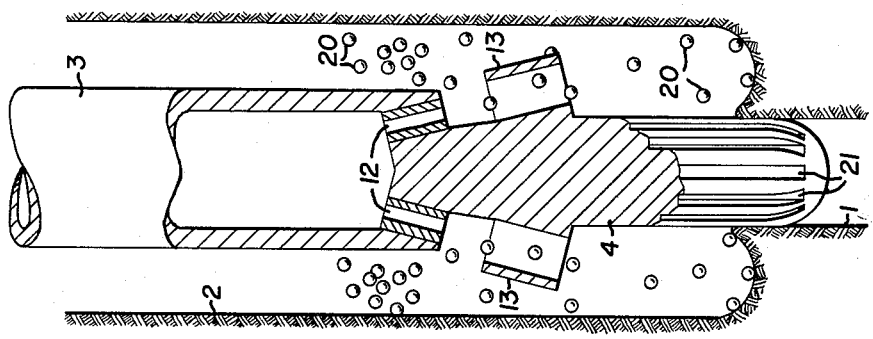
Morris Roth Inventor
By *Richard H. Hoyt* Attorney

United States Patent Office 2,743,086
Patented Apr. 24, 1956

2,743,086

PELLET IMPACT REAMING APPARATUS

Morris Roth, Tulsa, Okla., assignor to Esso Research and Engineering Company, a corporation of Delaware Application January 29, 1952, Serial No. 268,823

5 Claims. (Cl. 255—73)

This invention concerns a novel method and apparatus for the reaming of bore holes. The invention provides a desirable technique for enlarging the diameter of a bore hole of fixed size to obtain a bore hole of increased diameter. This invention has application, for example, in the completion of oil wells, to convert an exploration well to a production well by increasing the diameter of the bore hole. The invention utilizes what has been called "pellet impact drilling," depending upon the percussion and fracturing forces of a multitude of jetted, high velocity pellets. Apparatus is provided to seal the original restricted bore hole in the immediate vicinity of the reaming operation to permit circulation and drilling by the pellet impact principle in an annular space encircling the original bore hole.

The basic principles of pellet impact drilling are fundamentally simple. Means are simply required to provide a jet of high velocity fluid including provision for entraining and accelerating pellets in this jet of fluid. The requisites of this drilling procedure concern the nature of the pellets employed, and the fluid employed therewith as a propelling and recirculation agent for the pellets.

The pellets to be employed must be of substantial size. Thus it has been found that granular pellets or pellets having a diameter less than about ⅛ of an inch are relatively ineffective in drilling. In general the rate of drilling attainable increases as the size of the pellets is increased. For this reason it is generally preferred to employ the largest pellets possible, consistent with the nozzle size of the apparatus and the fracturing characteristics of the pellets. As will be emphasized, the nature of the drilling fluid employed also has a bearing on the size of the pellets. However, it may be stated that when employing a gas, such as air, for the drilling fluid, pellets of about ⅛ to a quarter of an inch in diameter are to be employed. When using a liquid, such as water or drilling mud, as the drilling fluid, the pellets may range in size from about ¼ to 1 inch. The preferred size range in this case is between ½ and ¾ of an inch.

It is important that the pellets have the greatest practical density. It is apparent that the greater the density of a given sized pellet the greater the kinetic energy which can be attained and the greater the impact force which can be developed. Again, as will be brought out, the separation characteristics of the pellets from the drilling fluid employed play an important part in drilling efficiency. Since separation rate of the pellets from a fluid depends in part upon the density of the pellets, it is apparent that this factor again dictates use of a high density pellet.

The configuration and surface characteristics of the pellets are also important. The pellets should be substantially spherical in nature and should have a smooth surface so as to limit wear of the jet nozzle assembly through which the pellets are to be ejected. In this connection it is fundamental that a spherical body possesses the best resistance to fracture due to impact; no other shape possesses the mechanical strength of a sphere. The factors of spherical configuration and smooth surface also relate to the separation characteristics of the pellets from the entraining fluid as will be noted below.

In view of these considerations the pellets to be employed are generally metal spheres having the desired properties of impact resistance, hardness, and toughness. Iron, steel and other ferrous alloys may be employed to prepare the pellets. In this connection, however, it should be observed that it is essential that the metal chosen be non-brittle in character. Thus, for example, finished ball bearings have been found to be impractical for use in this invention although ball bearing blanks obtained prior to surface hardening are satisfactory. Due to their high density, tungsten carbide alloys of the less brittle character are attractive for use in the pellets to be employed. Again, alloys of this character or other dense metals may be employed as a pellet core material, surfaced by ferrous alloys having the requisite toughness.

As suggested heretofore, the separation characteristics of the pellets from the drilling fluid play an important part in the efficiency of pellet impact drilling. It is apparent that in jetting a stream of fluid, entraining the pellets referred to, against a formation to be drilled, it becomes important that the pellets readily separate from this stream of fluid. This is required so that the pellets will not be cushioned by the fluid and will not be inefficiently swept from the drilling zone in the fluid flow stream. Again, regardless of the type of pellet recirculation employed, it becomes necessary in some manner to subsequently secure separation of pellets from an upward flow of drilling mud in the bore hole for return and recirculation of the pellets to the drilling zone.

Consequently, as emphasized heretofore, pellets of the character defined must be employed to have the separation characteristics required for effective drilling. In this connection it is apparent that the nature of the drilling fluid employed also affects the separation characteristics of the pellets. From this viewpoint it is desirable to employ a drilling fluid having the lowest viscosity and lowest density practical, consistent with other requirements of the drilling fluid. It has been found that the drilling rate obtainable is proportional to the ratio of the density of the pellets to the density of the drilling fluid. This consideration makes tthe use of air or other gas attractive. Similarly, if a liquid is to be employed, water or other low density liquid is preferably employed. Nonetheless, if considered desirable, drilling muds of the character conventionally used in rotary drilling may be employed.

Recirculation of the pellets in the immediate vicinity of the drilling zone may be accomplished in a number of ways. When the pellets have been forced against a formation by jetted fluid, the fluid flow will carry the pellets outwardly and upwardly in an annular channel along the wall of the bore hole. At some point spaced above the bottom of the bore hole, it becomes necessary therefore to separate the entrained pellets from the upflowing drilling fluid. One method by which this may be accomplished is to provide a low velocity fluid zone above the drilling apparatus in which the pellets may settle by gravity into a recirculation system. Such a low velocity zone may be provided by narrowing the cross-sectional area of the apparatus immediately above the drill so as to provide an enlarged annular space in the bore hole. This gravity recirculation can be supplemented or substituted by a mechanical deflection system serving to maintain the pellets in captive recirculation. A shroud may be employed for this purpose of a character substantially blocking the bore hole but containing passages through which drilling fluid and pulverized earth formation may be carried to the surface of the earth.

It is generally desirable in obtaining a suitable ejection of pellets to employ a nozzle assembly utilizing a primary and secondary jet nozzle. The primary nozzle is employed to convert fluid pumping pressure to velocity energy. Consequently fluid pumped through the primary nozzle is subjected to a substantial pressure drop, of 100 pounds per square inch or more, to provide a constricted directed high velocity jet of fluid. A secondary nozzle is positioned immediately below and concentric with the primary nozzle. The secondary nozzle should have a substantially greater diameter than the primary nozzle to accommodate the total volume of fluid from the primary nozzle in addition to the volume of pellets there entrained. This configuration and arrangement of nozzles, by its nature, creates an aspirating effect which plays a part in the recirculation of the pellets.

The present invention utilizes these basic principles of pellet impact drilling in a novel manner. An essential feature of the invention concerns the sealing of the bore hole to be reamed in the immediate vicinity of the pellet impact drilling zone. This is achieved by employing an elongated plug element which will substantially seal the original bore hole. This plug element can be forced downwardly into the original bore hole as drilling proceeds. An annular nozzle arrangement may be used, or one or more individual nozzles may be arranged around and somewhat above the plug element so as to provide a jetted stream of fluid which is directed downwardly along the periphery of the plug element. Pellets may be entrained in and recirculated by this fluid jet to cut an enlarged bore hole in which the inward circulatory path of the pellets is limited by the plug element described.

The present invention may be embodied in many different forms of apparatus. The accompanying drawings illustrate typical and preferred forms of reamers employing the principles of this invention. In these drawings:

Figure 1 is an elevational view partly in section illustrating one embodiment of the invention in drilling position in a bore hole;

Figure 2 is an elevational view of the same nature as Figure 1 but illustrating a reaming apparatus that includes a captive shroud for the pellets; and Figure 3 is a cross-sectional view of a modified form of apparatus of the general character of that shown in Figure 2, the section being taken on a horizontal line passing through the apparatus in the region just below the primary nozzles and looking upwardly.

Referring to Figure 1, a bore hole 1 is illustrated which it is desired to ream so as to obtain a bore hole 2 having greater diameter. Pellet impact drilling apparatus of a character to accomplish this objective is illustrated in reaming position. The reaming apparatus may be suspended in the bore hole by means of a tubular support 3 which may constitute conventional drill pipe. An essentially cylindrical plug element 4 is fixed to and extends below the tubular support. The plug element 4 is constructed to have a diameter substantially that of the bore hole 1 to be reamed. It is the purpose of this plug element to effectively seal the original bore hole 1. A fluid-tight seal is not essential as it is the principal function of the plug element to prevent loss of pellets down the original bore hole. For this purpose the plug element is caused to snuggly fit the bore hole 1 although permitting forced sliding movement downwardly into the bore hole.

The plug element 4 at its juncture with the tubular support 3 is penetrated by a plurality of nozzle passageways 12. For example, three to ten constricted tubular nozzles may be positioned in the manner illustrated. These nozzles are directed downwardly and outwardly with respect to the plug element 4. Immediately below the nozzles 12 are a second group of nozzles 13 which may be fixed to the plug element 4. Nozzles 13 are positioned so as to be below and concentric to the nozzles 12.

Fluid pumped downwardly through the drill string and the tubular support 3 has access to the primary nozzles 12. When the fluid passes through these nozzles, the pumping pressure applied to the fluid is converted to high velocity flow energy causing ejection of a plurality of jetted streams of fluid. These jets of fluid are directed toward and pass through the secondary nozzle elements 13. The secondary nozzles are constructed to have a substantially greater diameter than the primary nozzles. Consequently an aspirating force is created which is effective in entraining pellets 20 into the fluid as it passes through the secondary nozzles. As a result pellets will be entrained in and accelerated by the jetted fluid as it passes through the secondary nozzles. The pellets thus entrained will be forcefully impinged against the earth formation and will thus exert the desired drilling action.

The jets of fluid propelled through the secondary nozzles, entraining the pellets referred to, will be directed downwardly so as to cause forceful impingement of the pellets against the earth formation encircling the plug element 4. The drilling fluid employed as a propelling force will then carry the pellets upwardly in the general drilling path illustrated so as to carry the pellets above the secondary nozzles 13. Here the aspirating force referred to will be effective in securing reentrainment of the pellets in the secondary nozzles 13. Continuous circulation of the pellets and the desired reaming action may thus be secured while rotating the apparatus described.

The apparatus of Figure 2 is similar to that of Figure 1 with the exception that a shroud element 7 is fixed to the tubular support 3 and has a downwardly extending skirt portion 9 as shown which effectively provides a cage for captive recirculation of drilling pellets. Thus the inner surface of the shroud element is shaped to have the configuration shown so as to provide an annular space between the inner surface of the shroud 7 and the outer surface of the plug element 4. A plurality of slots 15 are cut through the upper portion of shroud 7 adjacent its junction with tubular support member 3 so as to permit the upward passage of drilling mud and pulverized earth through the slots, the slots being sufficiently small however to prevent the drilling pellets to pass therethrough so that the pellets are essentially maintained in captive recirculation below the shroud member 7. The inner surface of the shroud, adjacent to the primary nozzles 12 and above the secondary nozzles 13, is preferably semi-circular in vertical cross-section. This configuration effectively aids captive recirculation and return of pellets to the secondary nozzles 13.

It is desirable to provide flutes 21 on the periphery of the plug element 4 in the manner illustrated so that rotation of the drill may establish a reaming action between the plug element 4 and the original bore hole 1 which is to be reamed. It thus becomes possible to employ a plug element having a somewhat greater diameter than the original bore hole to compensate for normal variations in the size of this bore hole without losing the plugging action required in the operation of this reamer.

Particularly in the case in which a relatively small enlargement of a bore hole is desired, a somewhat different circulatory pattern may be employed in securing impact and recirculation of the drilling pellets. It is practical to establish a circulatory pattern of such a nature that pellets are directed downwardly at one portion of the reamed bore hole and are recirculated upwardly at a different portion of the bore hole spaced around the rotational pattern of the jet nozzles. The fluid and pellets are thus circulated tangentially to the bore hole. This form of the invention is best illustrated by the drawing of Figure 3. This drawing essentially shows an apparatus of the general character of Figure 2, the view being a section taken on a horizontal line just above the tops of the secondary nozzles 13 and looking upwardly towards the top of the shroud and the lowermost termination of the primary nozzles 12. In this view the sleeve portion of the shroud is illustrated by the cross-sectioned, circular annulus 16 while slots cut through the upper portion of the sleeve portion are designated by numerals 17. It will be observed that in this form of the invention, the jet nozzles are maintained at spaced points around the axis of the apparatus. Slotted perforations for return of drilling mud to the surface of the earth are maintained in the shroud at spaced points displaced from the nozzles. Consequently a circulatory pattern is set up in which fluid jetted downwardly through nozzles 12 must pass rotationally around the drilled annulus to flow upwardly to the slots provided for upward circulation of the fluid. Deflection of the pellets at the upper portion of the shroud coupled with the aspiration action of the secondary nozzles serves to return the pellets to the secondary nozzles for continued circulation in this manner. Circulation of this character is particularly effective when the nozzles 12 are directed either toward or away from the rotational pattern followed by the nozzles on rotating the reaming apparatus. It will be observed that in this form of the invention, circulation of fluid and pellets is maintained downwardly and upwardly in the annulus between the shroud and the plug element at spaced points around the periphery of the plug element. It is for this reason that the apparatus of Figure 2 is particularly adapted for minor enlargement of a particular bore hole. The circulation pattern for pellets provided in the small annular channel between the shroud and the sleeve serves to minimize undesired pellet to pellet impact which otherwise could result.

As described, therefore, this invention concerns a method and apparatus for the reaming of a bore hole. The principles of pellet impact drilling are employed to direct a multitude of pellets forcefully against an annular shoulder of a bore hole to be enlarged. A slidable plug element sealing off the original bore hole is employed to limit inward movement of the pellets and to prevent loss of pellets down the original bore hole. In a preferred form of the invention a shroud element is employed to limit outward circulation of the pellets and to provide captive recirculation of the pellets adjacent the plug element to cut an enlarged bore hole of a desired size.

What is claimed is:

1. A drilling apparatus for reaming a bore hole in the earth comprising a tubular support, an elongated closed essentially cylindrical plug element having a diameter substantially that of the original bore hole to be reamed, said plug element being supported at the lower end of the tubular support in a manner essentially closing off the lower end of the bore thereof, at least one downwardly directed restricted fluid passageway leading from the bore of said tubular support to the exterior of said plug member adjacent the upper end thereof whereby ejection of fluid from within said tubular member through said passageway will create a fluid jet capable of circulating a plurality of pellets within an annulus defined by said plug member and the wall of the enlarged hole drilled by said pellets, said apparatus including at least one nozzle supported exterior of said plug element in spaced relation to, and in general alignment with, the jet flow path furnished by said restricted passage whereby to promote entrainment of the pellets in said fluid jet.

2. Drilling apparatus as defined by claim 1 wherein the periphery of the plug element is provided with flutes.

3. A drilling apparatus for reaming a bore hole in the earth comprising a tubular support, a shroud element fixed to said tubular support adjacent the lower end thereof and having an essentially cylindrical dependent skirt portion extending below said tubular support, and an elongated closed essentially cylindrical plug element having a diameter substantially that of the bore hole to be reamed, said plug element being supported at the lower end of said tubular support in a manner defining with said shroud skirt portion an annular chamber open at its bottom end, said shroud element having open perforations adjacent its juncture with said tubular support member, said perforations establishing restricted fluid passageways between said annular chamber and the annulus defined by the tubular support member and the borehole, said apparatus including at least one downwardly directed restricted passageway leading from within the bore of said tubular support into the top of said annular chamber whereby ejection of fluid from within said tubular member through said passageway will create a fluid jet capable of circulating a plurality of pellets of substantial size within a drilled annulus positioned below said support member, said annulus being defined by said plug member and the wall of the enlarged bore hole drilled by said pellets, said pellets being of larger size than said shroud perforations whereby said pellets are retained in captive circulation by said shroud.

4. Drilling apparatus as defined by claim 3 including a plurality of said downwardly directed restricted passageways in the form of first nozzle elements annularly disposed about the upper end of said annular chamber and including a like plurality of second nozzle elements each supported within said annular chamber in spaced relation to and in general alignment with one of said first nozzle elements.

5. Drilling apparatus as defined by claim 3 wherein said restricted passageway is in the form of a nozzle and wherein said shroud perforations are arranged in a region angularly displaced from said nozzle whereby a fluid circulation pattern is created in which jetted fluid will flow rotationally within said annular chamber.

References Cited in the file of this patent

UNITED STATES PATENTS

| | | |
|---|---|---|
| 48,914 | Dickey | July 25, 1865 |
| 1,502,851 | Gale | July 29, 1924 |
| 2,072,627 | Zublin | Mar. 2, 1937 |